C. E. ANDERSON.

LOCK.

APPLICATION FILED MAY 9, 1919.

Reissued Oct. 28, 1919.

14,741.

2 SHEETS—SHEET 1.

Inventor
Carl E. Anderson
By Attorneys.
Southgate & Southgate

C. E. ANDERSON.

LOCK.

APPLICATION FILED MAY 9, 1919.

Reissued Oct. 28, 1919.

14,741.

2 SHEETS—SHEET 2.

Inventor
Carl E. Anderson
By Attorneys
Southgate & Southgate

UNITED STATES PATENT OFFICE.

CARL E. ANDERSON, OF WORCESTER, MASSACHUSETTS.

LOCK.

14,741. Specification of Reissued Letters Patent. Reissued Oct. 28, 1919.

Original No. 1,263,358, dated April 23, 1918, Serial No. 74,578, filed January 27, 1916. Application for reissue filed May 9, 1919. Serial No. 296,007.

*To all whom it may concern:*

Be it known that I, CARL E. ANDERSON, a subject of the King of Sweden, residing at Worcester, in the county of Worcester and Commonwealth of Massachusetts, have invented a new and useful Improvement in Locks, of which the following is a specification, accompanied by drawings forming a part of this specification.

My invention relates to locks and, in one form, includes a bolt and a spring for maintaining the bolt in a withdrawn or unlocking position when the lock is not to function. This bolt is desirably rotatably mounted and is preferably adapted for movement by engagement with the locking member complemental thereto when the carrier for one of these locking members is moving into closing engagement, with the other carrier or is having an opening movement. As I have embodied the invention the bolt is carried on the door and the locking member complemental to the bolt is carried by the door jamb or is a formation provided on the door jamb. A detent is preferably employed for holding the bolt in locking position so that the door cannot be swung away from the jamb until this detent is released. A manually controlled detent actuating device is employed for releasing the detent from engagement with the bolt when the door is to be opened and when the detent is released the door may be swung open, as the bolt will then be free to turn. When the door has been swung sufficiently open to clear the bolt from the jamb and the bolt has been placed in unlocking position the aforesaid spring in one form of my invention, serves to hold the bolt in unlocking position so that the bolt cannot then project beyond the meeting face of the door in a manner to prevent the door from being closed. This spring is also desirably effective in completing the withdrawing movement of the bolt into an unlocking position, the locking member or portion on the door jamb turning the bolt partially to its unlocking position to a point where the spring may be effective to complete the movement of the bolt to the unlocking position. Said spring is also desirably effective in applying the pawl to the bolt to hold the bolt in a locking position. When the door is to be locked it is merely swung to, a bolt portion engaging the door jamb to swing the bolt to a position in which the spring will no longer be effective in holding the bolt in unlocking position, the same spring then preferably performing the substitute function of rocking the bolt to a locking position and holding it there, a result which occurs when the door is completely closed.

I will explain my invention more fully by reference to the accompanying drawings showing two forms thereof and in which—

Like parts are indicated by similar characters of reference throughout the different figures.

Figure 1:
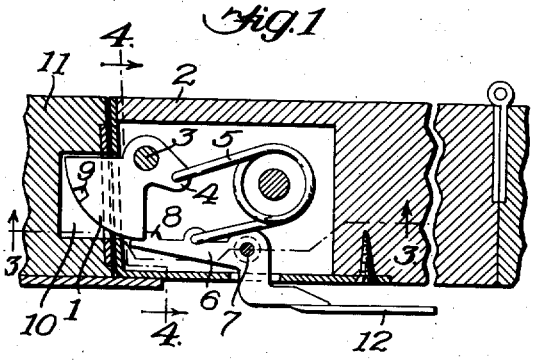
Figure 1 is a sectional plan view indicating a door (broken away) and a door jamb, this figure showing the bolt of the lock in locking position.
Figure 2:
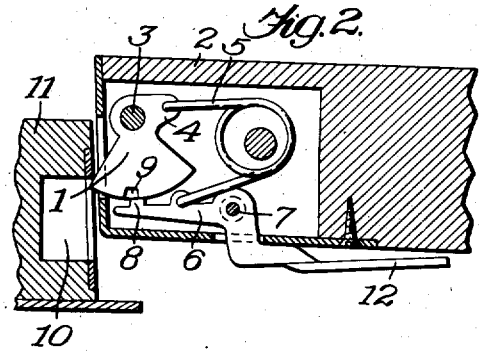
Fig. 2 is a view similar to Fig. 1 excepting that the bolt is shown very near its completely withdrawn position, the door being slightly open.
Figure 3:
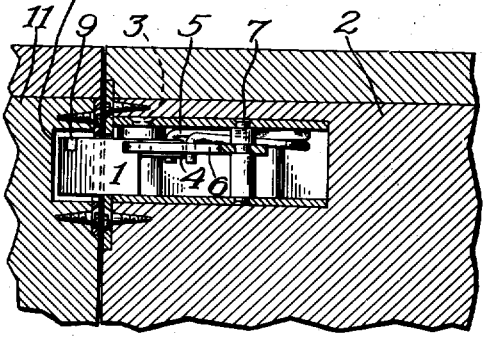
Fig. 3 is a view on line 3—3 of Fig. 1.
Figure 4:
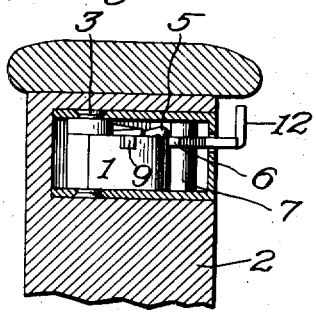
Fig. 4 is a view on line 4—4 of Fig. 1.
Figure 5:
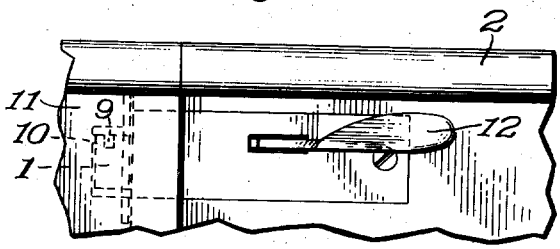
Fig. 5 is an elevation of parts as they appear in Fig. 1.
Figure 6:
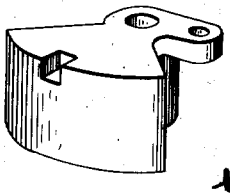
Fig. 6 is a perspective view of the bolt.

In both forms of locks illustrated there is a bolt 1 that is preferably pivotally mounted upon the door or other closure 2, constituting a carrier for the bolt, there being a pivot shaft 3 upon the door for the bolt. The bolt carries a crank arm 4 that is engaged by one end of a coiled spring 5, the other end of the coiled spring being flexibly connected with the detent 6. The detent is also pivotally mounted upon the door, as indicated at 7, and carries a lug 8 adapted to engage the bolt.

Referring first more particularly to the form of the invention shown in Figs. 1 to 5 inclusive, the lug 8 may enter the recess 9 in the bolt to hold the bolt when the bolt has reached an unlocking position. The tension of the coiled spring 5 is such that the ends thereof tend to approach each other whereby said spring serves to thrust the bolt outwardly into a locking position. When the door is closed the outwardly thrust bolt enters the recess 10 that forms a locking element, complemental to the bolt, in the door jamb 11 or locking element carrier. The detent 6 (Figs. 1 to 5) is formed in one piece with the thumb or hand piece 12, the detent being upon one side of the pivot 7 while the thumb piece 12 is upon the other side of such pivot. When the door is to be opened the thumb piece 12 is pressed upon to disengage the detent 6 from the bolt 1 (see Fig. 1) whereafter the door may be swung upon its hinge. As the door swings the door jamb operates upon the bolt to turn it in opposition to the force of the spring, the crank 4 serving to spread the ends of the spring apart thereby to increase the tension thereof. The bolt is fully brought to its unlocking position when the recess 9 is brought into register with the lug 8, the spring 5 forcing the entry of this lug into said recess. When the door has been swung to a closed position the thumb piece 12 is again pressed upon to release the lug 8 from the recess 9 whereupon the bolt will be outwardly rotated by the spring 5 that causes the entry of the bolt within the recess 10.

Figure 7:
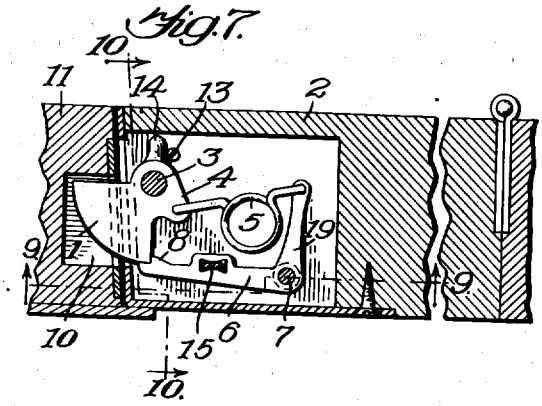
Fig. 7 is a sectional plan view of the preferred form of the invention, this figure showing a door (broken away) and a door jamb, the bolt of the lock being in locking position.
Figure 8:
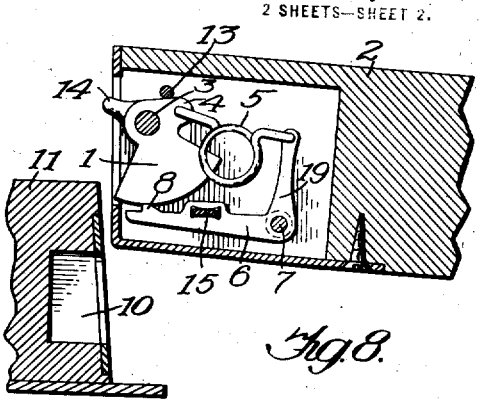
Fig. 8 is a view similar to Fig. 7 excepting that the bolt is shown very near its completely withdrawn position, the door being slightly open.
Figure 9:
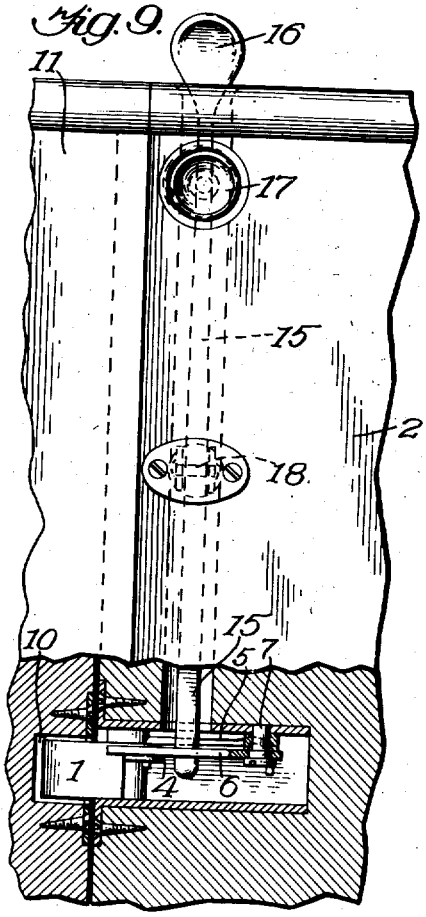
Fig. 9 is a view on line 9—9 of Fig. 7.
Figure 10:
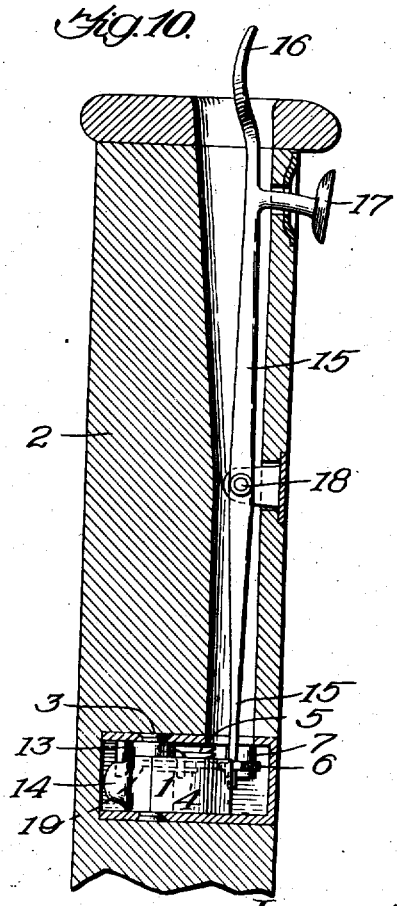
Fig. 10 is a view on line 10—10 of Fig. 7.

In the preferred form of the invention shown in Figs. 7 to 10 inclusive, the bolt 1 is held in either of its alternative positions by means of the spring 5 whose end that is connected with the crank arm 4 lies upon one side of the pivot shaft 3 when the bolt is in the locking position and upon the other side of this shaft when the bolt is in an unlocking position (see Figs. 7 and 8). When the door 2 is opened the bolt 1 is turned in a counter-clockwise direction until it engages the stop 13 to bring the end of the spring 5 that is connected with the bolt upon the other side of the shaft 3, as indicated in Fig. 8. When the bolt is thus positioned the bolt portion 14 (preferably in the form of a lug or projection) upon the bolt is projected beyond the door so as to be engaged by the door jamb 11 when the door is being closed whereby the bolt will be turned in a clockwise direction sufficiently to enable the spring 5 to thrust the bolt into locking position. In the form of the invention shown in Figs. 7 to 10 inclusive the lug 8 upon the detent 6 holds the bolt in locking position as indicated in Fig. 7 but has no restraining influence upon the bolt when the bolt is not in a locking position. The detent 6 is therefore to be withdrawn whenever the door 2 is to be opened, any suitable mechanism being employed for this purpose. The mechanism for controlling the detent 6 in the form of the invention shown in Figs. 7 to 10 inclusive embraces an intermediately pivoted lever 15 which may have two thumb pieces 16, 17, either of which may be engaged for the purpose of swinging the lever 15 upon its pivot 18. The lower end of this lever is connected with the detent 6 so that the detent is rocked in a counter-clockwise direction whenever the lever 15 is operated by hand. When the lever 15 is pushed upon the detent 6 is disengaged from the locking bolt thereby to permit the door 2 to be opened to enable the locking bolt to be turned upon its pivot 3 sufficiently to bring the end of the spring 5 that is connected with the locking bolt upon the other side of the axis of the pivot to enable the locking bolt to be placed in the withdrawn position shown in Fig. 8. The end of the spring 5 that is opposite to the end connected with the locking bolt may be connected with an arm 19 in rigid relation to the detent 6 whereby the detent lug 8 is forced into holding engagement with the locking bolt 1 when the door is closed.

While I have herein shown and particularly described the preferred embodiment of my invention and one modification thereof, I do not wish to be limited to the precise details of construction shown as changes may readily be made without departing from the spirit of my invention, but having thus described my invention I claim as new and desire to secure by Letters Patent the following:—

1. A lock including a rotably mounted bolt, a spring for turning the bolt in locking and unlocking movements, a detent for engaging the bolt to hold it in locking position, and a manually engageable detent actuating element for releasing the detent from engagement with the bolt, the spring being also connected with the detent to force it into holding engagement with the bolt when the bolt is placed in locking position.

2. A lock including a rotatably mounted bolt, a spring for turning the bolt in locking and unlocking movements, a detent for engaging the bolt to hold it in locking position, and a manually engageable detent actuating element for releasing the detent from engagement with the bolt, said bolt having a portion for engagement to effect the turning of the bolt to locking position and positioned for such engagement when the bolt is placed in an unlocking position, the spring being also connected with the detent to force it into holding engagement with the bolt when the bolt is placed in locking position.

3. A lock having, in combination, a rotatably mounted bolt, a single spring effective to yieldingly hold said bolt in both locked and unlocked positions, a detent to hold said bolt positively in locked position, and manual means to remove said detent from holding position, said spring being also effective to render said detent normally operative.

4. A lock having an active latch member and a passive latch member coöperating therewith, a secondary latch for anchoring said active latch member in latching position, manual means to release said latch, and a single spring freely supported by said active member and said latch and effective to exert a force on said active latch member to maintain the same in unlatched position and also to exert a force on said secondary latch to actuate said secondary latch into a position for anchoring said active latch member in latching position.

In testimony whereof I have hereunto affixed my signature.

CARL E. ANDERSON.